Jan. 9, 1934.　　　H. B. HAINES　　　1,942,475
DETACHABLE EXTENSION FOR TRACTOR TRUCKS
Filed April 29, 1931　　3 Sheets-Sheet 3
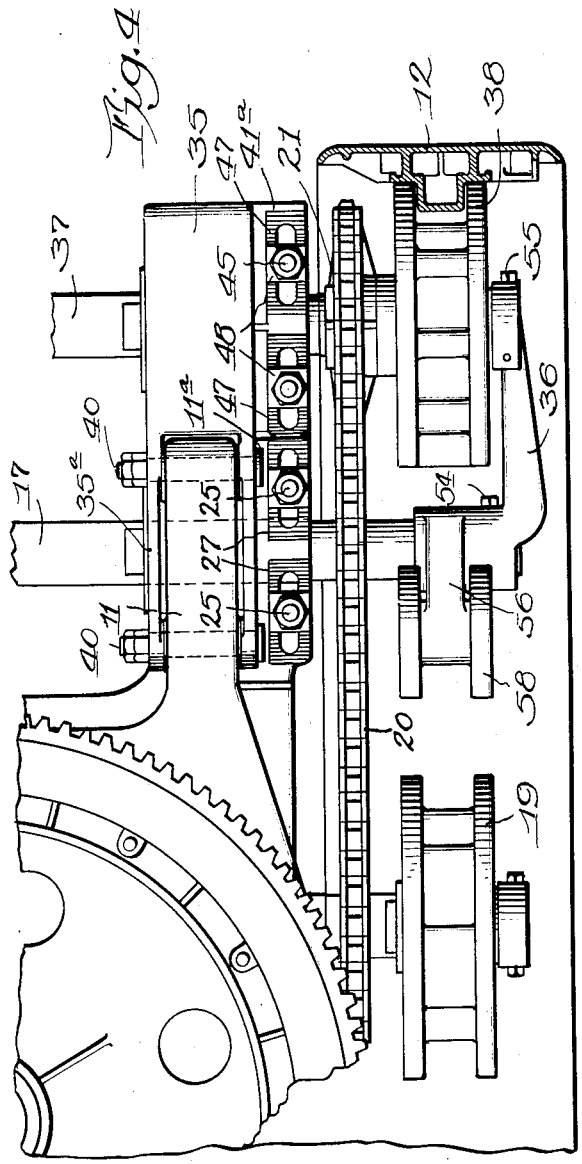
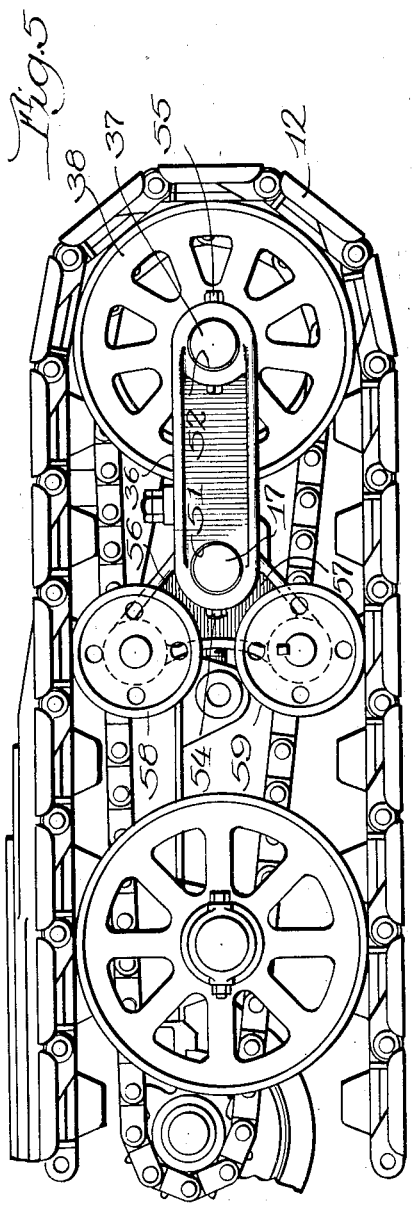
Inventor,
Homer B. Haines
Offield Towlhope Scott & Poole
Attys.

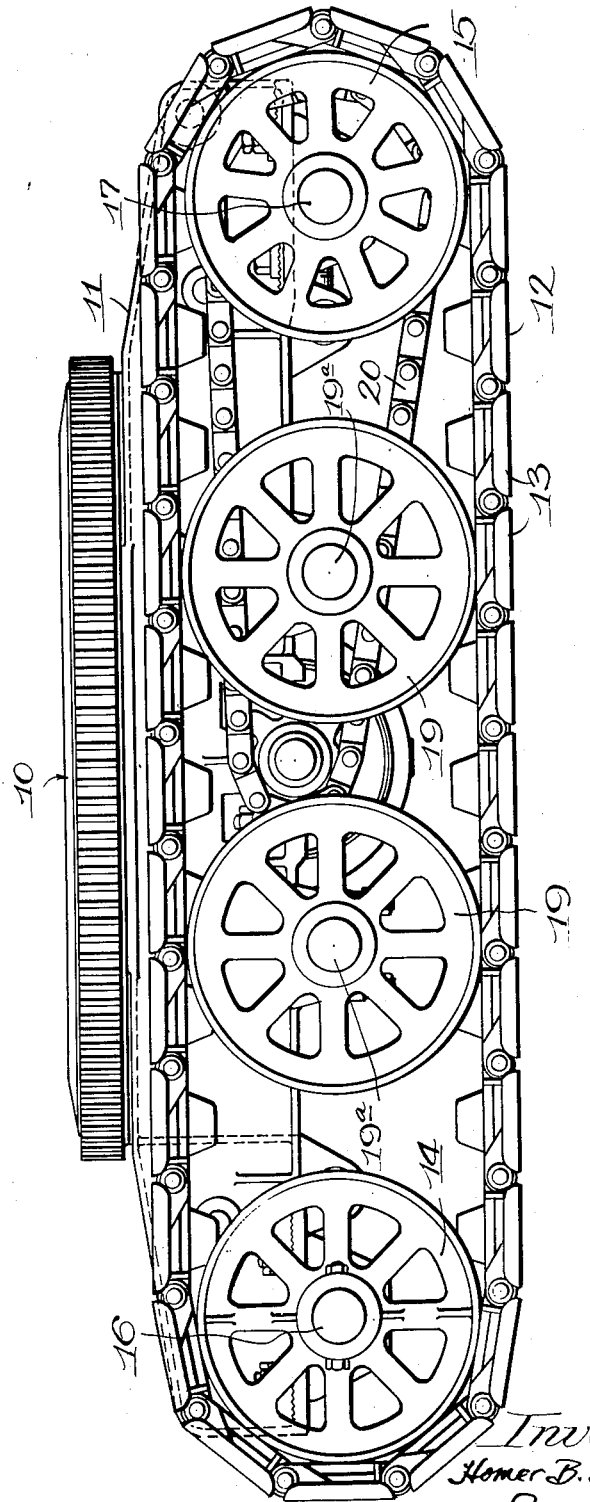

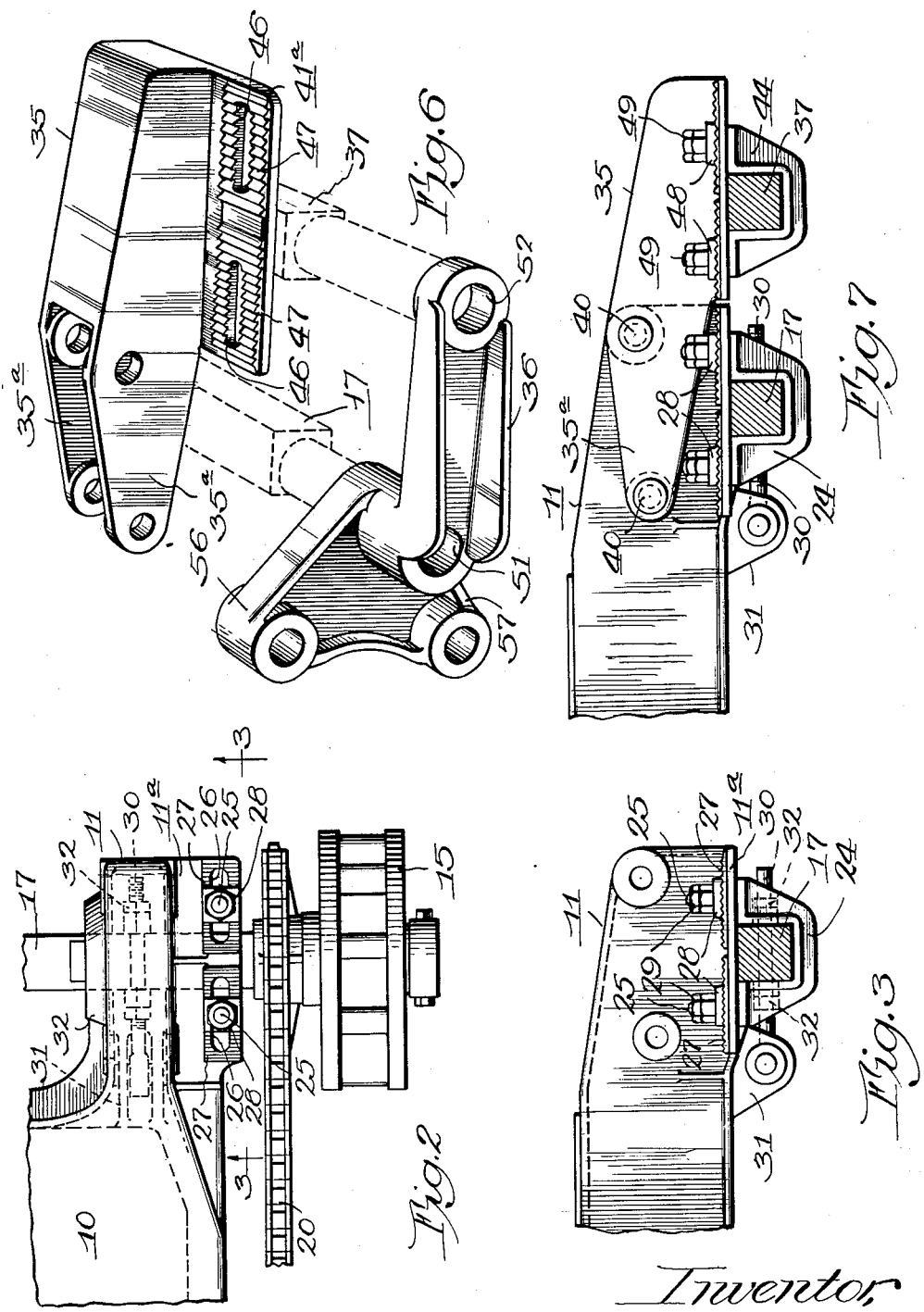

Patented Jan. 9, 1934

1,942,475

UNITED STATES PATENT OFFICE 1,942,475

DETACHABLE EXTENSION FOR TRACTOR TRUCKS

Homer B. Haines, Lima, Ohio, assignor to The Ohio Power Shovel Company, Lima, Ohio, a corporation of Ohio Application April 29, 1931. Serial No. 533,617

7 Claims. (Cl. 305—8)

This invention relates to improvements in extension attachments for endless tread tractors, and has for its principal object to provide a simple and efficient device of the character described which is capable of being readily applied with minimum labor and mechanical skill.

Endless tread tractors are extensively used to support power shovels, excavators, cranes or like machines, and the treads of such machines are usually manufactured with a fairly standardized ratio of weight and effective tread supporting area which has been found to give proper traction support on most types of soil over which the machines are to be used. In a few portions of the country, however, certain types of soil are encountered which require treads of somewhat greater supporting area.

In carrying out my invention, I provide an extension device to be used with treads of standard length so as to quickly and readily extend the supports for the two treads at one or both ends of the tractor, whereby the treads themselves may be lengthened by increasing the number of links thereof. The attachment is particularly designed so as to be capable of being easily attached or detached in the field as occasion demands, with a minimum of labor and skill.

The invention may best be understood by reference to the accompanying drawings, in which Figure 1 is a side view of an endless tread tractor truck of standard length such as constructed at the factory.

Figure 2 is a detail plan view of the adjusting mechanism for the end axles at the end of the standard frame structure shown in Figure 1.

Figure 3 is a detail side view of the axle adjusting mechanism taken on line 3—3 of Figure 2.

Figure 4 is a plan view in part section of the mechanism shown in Figure 5.

Figure 5 is a fragmentary side view of one end of the truck shown in Figure 1, but with the extension support attached thereto.

Figure 6 is a perspective view of the parts making up the extension support shown in Figures 4 and 5; and Figure 7 is a detail side view of the extension support as applied to the main frame in Figures 4 and 5.

Referring now to details of construction of the embodiment of my invention illustrated in the drawings, an endless tread tractor truck of standard construction will first be described, to which my improved form of extension is adapted to be applied. As shown in Figure 1, said truck includes a main or base frame 10 adapted to support a superstructure such as a power shovel, excavator, crane or the like, which superstructure has been omitted from the drawings as it forms no part of the present invention. The main frame includes a pair of longitudinal side frame members or beams 11, 11 to which the endless tread mechanism is attached.

In the form shown, each of the tread mechanisms 12 comprises a plurality of tread links 13, 13 trained over two end wheels 14, 15 mounted on transverse axles 16 and 17, respectively. Said axles extend the width of the frame and are each suitably supported at the ends of the side frames 11.

The intermediate portions of the tread flights may be supported by any suitable means. In the form shown, two idler wheels 19, 19 of substantially the same diameter as the end wheels 14 and 16 are mounted on axles 19ª, 19ª, respectively.

The endless tread 12 is driven in any suitable manner, in the form shown the drive being provided through a flexible chain 20 connected to chain sprockets 21, 21 on the end wheels 15, 15 and driven through any suitable power mechanism.

In the form of tread mechanism illustrated herein, the end axles 16 and 17 are both provided with limited longitudinal adjusting means. Adjustment of the axle 16 and idler wheel 14 carried thereby affords take-up for the treads 12, 12, while adjustment of the opposite end axle 17 and the driven wheels 15, 15 carried thereby affords an independent take-up for the drive chain 20.

The axle adjusting means at the four corners of the frame being similar, a description of one such means will be understood to apply to all.

Referring to the detail view of the adjusting axle means shown in Figures 2 and 3, it will be seen that the side frame member 11, together with a flanged portion 11ª, rests upon the squared axle 17. A U-shaped bracket 24 surrounds the axle and has a pair of bolts 25, 25 extending upwardly from the bracket through longitudinally extending slots 26, 26 formed in the flanged portion 11ª. The upper portion of the flange adjacent the slots is serrated, as shown at 27, 27. A pair of co-operating serrated blocks 28, 28 are mounted on the bolts and are secured thereon by nuts 29, 29 threaded on said bolts so as to maintain the axle in any position of longitudinal adjustment.

Means are also provided for positively moving the axle into various adjusting positions by means of a horizontally extending bolt 30 pivoted on bracket 31 projecting below the main portion of the frame member 11, said bolt passing through the squared axle 17 and having nuts 32, 32 threaded thereon and disposed on opposite sides of the axle. When the nuts 29, 29 on the U-shaped bracket 24 are loosened so as to permit the serrated blocks 28, 28 to be moved along the serrated portion 27, 27 of flange 11ª, the nuts 32 on bolt 31 may be turned to move the axle positively into a new position. After being thus moved, the axle 17 will again be secured by the U-shaped bracket 24 and serrated blocks 28, 28.

It will be understood that the tread construction above described is such as may be made at the factory and is of such length as to be suitable for most operating conditions. As has heretofore been pointed out, however, it is sometimes necessary to provide additional supporting area for the treads, and for this purpose I provide the extension attachments at the ends of the side frames 11 as illustrated in Figures 4 to 7.

The parts of each set of said extension attachments are shown in detail in Figures 6 and 7 and comprise a side frame extension bracket 35 and an axle supporting bracket 36 attached to opposite ends of the end axle 37 when the same is mounted in the extended position shown in Figures 2 and 3.

It should be explained that it is usually unnecessary, and in most cases undesirable, to extend the tread to such an unwieldy length as to accommodate an additional full size idler wheel similar to the intermediate idler wheels 19, 19. Accordingly, I provide an attachment in which one of the end axles, as for instance, axle 17, has its drive wheels 15, 15 and chain sprockets 21, 21 removed therefrom, but said axle is retained in its original position on the side frame and is utilized as an auxiliary support for the extension attachments. An additional axle 37 and wheels 38, 38 are then supported by said attachments at the extreme end of the tread, which axle and wheels now form the new end axle. When applied to the drive end of the truck as shown, the drive sprockets 21, 21 are transferred to the new wheels 38, 38 and form the new drive connections for the tread.

As will be seen from Figures 2 and 6, the side frame extension 35 may be connected to the end of the side frame 11 by any suitable means, such as bifurcated arms 35ª, 35ª which span the sides of the main portion of the side frame 11 and are secured thereto by through-bolts 40, 40. The extension bracket 35 is provided with a flanged portion 41ª which is similar in construction and arrangement to the serrated adjusting flange 11ª of the side frame 11, and arranged in horizontal alignment therewith, as clearly shown in Figures 2 and 7. The new end axle 37 is provided with a U-shaped bracket 44 having upright bolts 45, 45, serrated blocks 48, 48 and securing nuts 49, 49, all of the same construction and arrangement as the similar parts described in connection with the U-shaped adjusting bracket 24 on the axle 17.

The outer supporting bracket 36 is provided with two longitudinally spaced apertures 51, 52 which fit on the cylindrical ends of the axles 17 and 37, respectively, and are secured thereto by suitable means, such as through-bolts 54 and 55. Said bracket also carries two vertically spaced bearing brackets 56, 57 on which are rotatively mounted idler wheels 58 and 59, respectively, forming an intermediate supporting guide for the upper and lower flights of the tread, as clearly shown in Figure 5.

It will be understood, of course, that in applying the attachment above described, additional links are put in the endless tread 12 as required. Similarly, when the extension attachment is connected to the drive end of the tread as shown, additional links are supplied to the drive chain 20.

All of the parts of the extension attachment and auxiliary axle are as rigidly connected to the main frame as the end axles and tread supporting devices before extension.

When the extension attachment is applied as shown in Figures 4 and 5, it will be observed that the new end axle 37 may be longitudinally adjusted relative to the main frame by means of the same horizontal adjusting bolts 30 and nuts 32, 32 that are used for the axle 17, as previously described. This is possible because in positively moving the axle 17 by operation of the nuts 32, 32, the end axle 37 is also moved bodily therewith owing to the fact that side extension brackets 36 rigidly connect the ends of the two axles together.

It will now be understood that the tread of standard length such as will afford sufficient effective supporting area under ordinary conditions may be quickly and readily extended in length when occasion demands, by the use of the extension brackets above described. These extension brackets may easily be applied or detached in the field with minimum labor and skill. The end axle and its longitudinal adjusting devices are not disturbed, although the supporting wheels 15, 15 on the end axle, together with their drive sprockets 21, 21 (if such drive sprockets are used) are removed from the end axle. The extension brackets 35, 35 are then attached to the side frames 11, 11. The additional or auxiliary axle 37 is placed beneath the extension brackets 35, 35, said auxiliary axle being provided with tread supporting wheels at opposite ends, which may be supplied by transferring the wheels 15 (and their associated drive sprockets, if used), from the end axle 17 to the auxiliary axle 37. The end brackets 36, 36 are then applied to the outer ends of the end and auxiliary axles, and the auxiliary axle may then be secured to the extension brackets 35 by U-shaped brackets 44.

Although I have illustrated and described one particular embodiment of my invention, it will be understood that I do not wish to be limited to the exact construction shown and described, except as claimed, and that various changes and modifications may be made without departing from the spirit and scope of my invention as set forth in the appended claims.

I claim:

1. In an endless tread tractor, a main frame, a transverse end axle adapted to have tread supporting wheels detachably mounted thereon, a detachable extension attachment comprising an auxiliary transverse axle having tread supporting wheels thereon, extension brackets detachably and rigidly connected to the frames in supporting relation relative to said auxiliary axle, and end brackets extending between and connected to the outer ends of said end and auxiliary axles outside the tread supporting wheels of the latter, said end brackets having apertures to adapt the end brackets to be mounted on the end axle after said first mentioned supporting wheels have been removed.

2. In an endless tread tractor, a frame, a transverse end axle adapted to have tread supporting wheels detachably mounted thereon, an endless tread including upper and lower flights, a detachable extension attachment comprising an auxiliary transverse axle having tread supporting wheels thereon, extension brackets detachably and rigidly connected to the frame in supporting relation relative to said auxiliary axle, and end brackets extending between and connected to the outer ends of said end and auxiliary axles outside the tread supporting wheels of the latter, said end brackets having apertures to adapt the end brackets to be mounted on the end axle after said first mentioned supporting wheels have been removed, and auxiliary supporting guides for the upper and lower flights of the tread carried by said end brackets adjacent the end axle.

3. In an endless tread tractor, a frame, a transverse end axle adapted to have tread supporting wheels detachably mounted thereon, a detachable extension attachment comprising an auxiliary transverse axle having tread supporting wheels thereon, extension brackets detachably and rigidly connected to the frame in adjustable supporting relation above said auxiliary axle, end brackets extending between and connected to the outer ends of said end and auxiliary axles outside the tread supporting wheels of the latter, said end brackets having apertures to adapt the end brackets to be mounted on the first-named axle when said first-named wheels have been removed, longitudinal adjusting means for said end axle carried on said main frame and effective to adjust the position of the auxiliary axle through said end brackets.

4. In an endless tread tractor, a frame, a transverse end axle adapted to have tread supporting wheels detachably mounted thereon, a detachable extension attachment comprising an auxiliary transverse axle having tread supporting wheels thereon, extension brackets detachably and rigidly connected to the frame in adjustable supporting relation relative to said auxiliary axle, end brackets extending between and connected to the outer ends of said end and auxiliary axle outside of the tread supporting wheels of the latter, said brackets having apertures to adapt the end brackets to be mounted on the end axle after said first mentioned supporting wheels have been removed, longitudinal adjusting means for said end axle carried on said main frame, effective to adjust the position of the auxiliary axle through said end brackets, and clamping means for said auxiliary axle carried by said extension brackets.

5. In an endless tread tractor, a frame and a tread mechanism supported on said frame including a transverse end axle extending beyond said frame and adapted to have tread supporting wheels detachably mounted thereon on opposite sides of said frame, a detachable extension attachment comprising an auxiliary transverse axle having tread supporting wheels thereon, a pair of extension brackets detachably and rigidly connected to the ends of said frame, means connecting said auxiliary axle in supporting relation to said extension brackets, and end brackets extending between and connected to the outer ends of said end axle and auxiliary axle outside of the tread supporting wheels of the latter, said brackets having apertures to adapt the end brackets to be mounted on the end axle after said first mentioned supporting wheels have been removed.

6. In an endless tread tractor, a pair of side beams and a tread mechanism supported on said side beams including a transverse end axle extending beyond said beams and adapted to have tread supporting wheels detachably mounted thereon on the outer sides of said beams, means for positively adjusting said end axle longitudinally of each of said beams, a detachable extension attachment comprising an auxiliary transverse axle having tread supporting wheels thereon, a pair of extension brackets detachably and rigidly connected to the ends of said beams, means connecting said auxiliary axle in longitudinally adjustable supporting relation to said extension brackets, and end brackets extending between and connected to the outer ends of said end axle and auxiliary axle outside of the tread supporting wheels on the latter, said end brackets having apertures to adapt the end brackets to be mounted on said end axle after said first mentioned supporting wheels have been removed.

7. In an endless tread tractor, a frame, a transverse end axle adapted to have tread supporting wheels detachably mounted thereon, a detachable extension attachment comprising an auxiliary transverse axle having tread supporting wheels thereon, an extension bracket detachably and rigidly connected to the frame in adjustable supporting relation above said auxiliary axle, end brackets extending between and connected to the outer ends of said end and auxiliary axles outside of the tread supporting wheels on the latter, said end brackets having apertures to adapt the end brackets to be mounted on said end axle after said first mentioned supporting wheels have been removed, and means for adjusting said end axle longitudinally relative to said main frame and effective to adjust the position of said auxiliary axle through said end brackets.

HOMER B. HAINES.